United States Patent
Shiverick et al.

(10) Patent No.: US 7,499,922 B1
(45) Date of Patent: Mar. 3, 2009

(54) INFORMATION RETRIEVAL SYSTEM AND METHOD

(75) Inventors: Reginald C. Shiverick, Cleveland, OH (US); Robert Brooks Pollock, Solon, OH (US)

(73) Assignee: Dakota Software Corp., Rochester, NY (US)

( * ) Notice: Subject to any disclaimer, the term of this patent is extended or adjusted under 35 U.S.C. 154(b) by 1611 days.

(21) Appl. No.: 09/842,127

(22) Filed: Apr. 26, 2001

(51) Int. Cl.
*G06F 17/30* (2006.01)
*G06F 7/00* (2006.01)

(52) U.S. Cl. .................. 707/7; 707/3; 707/10
(58) Field of Classification Search ............ 707/7, 707/6, 5, 3, 102, 10
See application file for complete search history.

(56) References Cited

U.S. PATENT DOCUMENTS

| | | | |
|---|---|---|---|
| 5,838,317 A * | 11/1998 | Bolnick et al. | 707/7 |
| 5,842,218 A * | 11/1998 | Robinson | 707/102 |
| 6,212,529 B1 * | 4/2001 | Boothby et al. | 707/201 |
| 6,247,009 B1 * | 6/2001 | Shiiyama et al. | 707/3 |
| 6,348,932 B1 * | 2/2002 | Nishikawa et al. | 715/719 |
| 6,397,228 B1 * | 5/2002 | Lamburt et al. | 707/203 |
| 6,529,399 B1 * | 3/2003 | Namekawa et al. | 365/149 |
| 6,760,721 B1 * | 7/2004 | Chasen et al. | 707/3 |
| 7,028,043 B2 * | 4/2006 | Bleizeffer et al. | 707/102 |
| 7,054,870 B2 * | 5/2006 | Holbrook | 707/10 |
| 7,058,890 B2 * | 6/2006 | George et al. | 715/728 |
| 7,080,328 B1 * | 7/2006 | Sawyer | 715/853 |

OTHER PUBLICATIONS

Soumen et al. Scalable feature selection, classification and signature generation for organizing large text database into hierarchical topic taxonomies, The VLDB journal-The international Journal on Very Large Data Bases, V. 7, Issue 3, Aug. 1998, lines 163-178.*
Frasconi et al. Data Categorinzation using decision Trellises, Knowledge and Data Engineering, IEEE Transaction, vol. 11, Issue. 5, Sep.-Oct. 1999, pp. 697-712.*

* cited by examiner

*Primary Examiner*—Baoquoc N To
(74) *Attorney, Agent, or Firm*—Rothwell, Figg, Ernst & Manbeck

(57) ABSTRACT

An information retrieval method, process, and apparatus are provided which includes iterative or parametric data set querying. The result of each query iteration is displayed in an easy to analyze fashion, enabling the user to interactively refine the query with additional iterations. Each field of data in a data set is represented by a filter in a filter tree table. A user may graphically select and de-select filters using the filter tree table. The selections are converted into a filtering query that is run against the data set to produce filtered data. A summary query is then run against the results of the filtering query. The filtered data is displayed, along with the selected filters of the filter tree table. The filter tree table may also include and display other information related to each filter, such as an associated data item count as generated by the summary query. Further user input is accepted, with the user input further selecting or de-selecting data groupings to be displayed. The user input is fed back to generate another filtering iteration. In this manner, when the user makes a single selection or de-selection, all applicable filters are changed, and the user changes are propagated through all appropriate filters.

21 Claims, 7 Drawing Sheets

FIG. 4

| ID# | Action Plan | Status | Date Due | Priority | Respo... |
|---|---|---|---|---|---|
| 102-7 | Submit Tier II forms to the local fire department and document the submittal. | | 06/01/2000 | High | Enviro... Coordi... |
| 103-1 | Characterize laboratory waste and cleaning solvent to determine if they are hazardous wastes. | | 10/01/2000 | Very High | Enviro... Coordi... |
| 103-2 | Contact TSDF to determine status of waste shipments. | | 12/01/1999 | High | Plant /... |
| 103-3 | | | 11/17/2000 | Medium | |
| 103-4 | | | 11/16/2000 | | |
| 103-5 | Close all containers of hazardous waste in the satellite accumulation area. | | 01/01/2000 | High | Hazar... techni... |
| 103-6 | Arrange facility inspection by local fire department. | | 03/01/2000 | | Plant /... |
| 103-7 | | | 11/15/2000 | | |
| 103-8 | Have SPCC Plan reviewed and certified by a Professional Engineer. | | 01/01/2000 | Medium | Mainte... |
| 103-9 | Identify the facility's emergency response | | 03/01/2000 | Low | Enviro... |

ORGANIZATION panel:
- ☑ ▽ Organization
  - ☑ ▽ Acme Company>
    - ☑ ▽ {18} Chemical Division>
      - ☑ ▽ {43} Examples>
        - ☑ Date Due
          - ☑ {6}null
          - ☑ {3} 1999
          - ☑ 2000
            - ☑ {15} January
            - ☑ {13} June
            - ☑ {11} March
            - ☑ {3} November
            - ☑ {10} October
        - ☑ ▽ Resp. Person
          - ☑ {9}
          - ☑ {7} Environmental Coordinator
          - ☑ {9} Facilities Manager
          - ☑ {3} Hazardous waste technician
          - ☑ {9} Joe Smith
          - ☑ {6} Maintenance Supervisor
          - ☑ {9} Plant Manager
          - ☑ {6} Safety Engineer
          - ☑ {3} Training manager

FIG. 6

ORGANIZATION | FILTERS

- Organization
  - ▽ Acme Company>
    - ☑ ▽ {5} Chemical Division>
      - ☑ ▽ {8} Examples>
        - ▽ Date Due
          - ☑ null
          - ☑ 1999
          - ☑ 2000
            - ☑ {6} January
            - ☑ {1} June
            - ☑ {5} March
            - ☑ November
            - ☑ {1} October
        - ▽ Resp. Person
          - ☑ Environmental Coordinator
          - ☐ Facilities Manager
          - ☐ Hazardous waste technician
          - ☐ Joe Smith
          - ☐ Maintenance Supervisor
          - ☐ Plant Manager
          - ☑ {6} Safety Engineer
          - ☑ Training manager

405

411  414  418  444

FILTERS | HELP

Detail  Split  Window  Show Field Chooser  Print / Export

3/2/2001

| 1 of 13 | | | | | |
|---|---|---|---|---|---|
| ID# | Action Plan | Status | Date Due | Priority | Respo |
| 102-7 | Submit Tier II forms to the local fire department and document the submittal. | | 06/01/2000 | High | Enviro Coordi |
| 103-1 | Characterize laboratory waste and cleaning solvent to determine if they are hazardous wastes. | | 10/01/2000 | Very High | Enviro Coordi |
| 103-9 | Identify the facility's emergency response contractor in the SPCC Plan. | | 03/01/2000 | Low | Enviro Coordi |
| 103-13 | Provide eye protection for workers in the parts cleaning area. | | 01/01/2000 | High | Safety |
| 103-16 | Install an emergency shower/eyewash station in the forklift battery recharging area. | | 01/01/2000 | High | Safety |
| 406-1 | Characterize laboratory waste and cleaning solvent to determine if they are hazardous wastes. | | 03/01/2000 | | Enviro techni |
| 406-9 | Identify the facility's emergency response contractor in the SPCC Plan. | | 03/01/2000 | Medium | Enviro Coordi |
| 406-13 | Provide eye protection for workers in the parts cleaning area. | | 01/01/2000 | High | Safety |
| 406-16 | Install an emergency shower/eyewash station in the forklift battery recharging area. | | 01/01/2000 | High | Safety |
| 509-1 | Characterize laboratory waste and cleaning solvent | | 03/01/2000 | | Enviro |

402

600

INFORMATION RETRIEVAL SYSTEM AND METHOD

BACKGROUND OF THE INVENTION

1. Field of the Invention

The present invention relates generally to information retrieval, and more particularly to information retrieval employing a graphical interface.

2. Description of the Background Art

Data storage and retrieval is a very important part of modern life. Large amounts of data are stored, saved, and used for purposes of business, government, education, entertainment, etc. Large quantities of data are used by businesses and other institutions for financial record-keeping, inventory, customer data, employee records, etc.

One of the critical functional aspects of data storage is data organization. Data by itself is not useful unless it can be easily and efficiently obtained, used, organized, and stored for further use.

Databases are digital storage systems that are commonly used for storing large amounts of data. A database typically comprises a large storage device or devices, such as multiple magnetic disc drives or other storage media, and a database management system that is accessed in order to store, find, or retrieve data from within a storage device of the database.

Databases facilitate information storage and retrieval by allowing users easy access to large amounts of data. Databases also enable users to efficiently find and retrieve data. Furthermore, databases enable users to efficiently organize and reorganize data.

A relational database is a type of database composed of one or more related tables composed of rows and columns. A relational database therefore is capable of storing multiple types of data. The tables are related to each other by one or more keys, hence the name relational database. Tables of independent data can be linked or related to one another if all have columns of data (keys) that represent the same data value. An advantageous feature of a relational database is that, due to the multiple table architecture, additional data can be added to a relational database by adding additional tables related by one or more keys.

FIG. 1 shows a typical database 100 comprising multiple data tables 103, 106, and 109. Each table may contain multiple rows and multiple columns. Each row contains data for a particular item, such as an employee in this example. At least one key is used to relate the three tables 103, 106, and 109 to each other. In the example shown, the key may be a series of employee numbers, with each employee number key being unique to an individual employee. Therefore, a particular employee number key may be used to reference an employee name or social security number from table 103, a department number from table 106, an employee age from table 109, etc. Because of the use of the primary key, additional data could later be added, such as, for example, a table of employee first names. Therefore, the use of keys allows for information storage and retrieval without regard for organization. Entries may be added or deleted as needed, regardless of their physical location on the data storage medium.

Information retrieval according to the prior art is still keyboard-based and is generally non-visual. In contrast, humans tend to process information most efficiently when they are able to process it visually.

In the prior art, the use of keys has meant that searching for data items has been done using textual, command line database queries. Data is typically found and retrieved from a relational database by the means of a search employing Boolean search terms such as "AND", "OR", "NOR", "NOT", etc., to specify a particular data or data category. In addition, database searches have been substantially formalized through database standards, such as a SQL (structured query language) query. SQL is a software language that provides a standard database interface. For example, using a typical SQL-type query, a search for all employees of department number 1000 that are 55 years old may require a query entry of "dept=1000 AND age=55." This is a fairly simple query for experienced database users, but not necessarily simple to persons who have no acquaintance with Boolean logic and Boolean operators. This query therefore is not user-friendly or efficient. Furthermore, the query may easily become more complex if the user desires information that includes and excludes certain persons. Furthermore, typing or otherwise entering textual queries is time-consuming for the user, and the user must understand how to format the search. The search may be unsatisfactory or may fail if the user does not type in terms correctly or does not know what data is stored in the particular database being accessed.

Efficient and user-friendly information retrieval has become more and more important as databases grow in size and as users become less sophisticated in database knowledge and manipulation. A good example of this is in the explosion of client-server data storage applications. A difficulty that may be encountered in client-server data storage applications is that the user (client) may not know anything about database design or functionality. This is especially true in data transactions over the Internet, where the user may not even be aware that he or she is accessing a database. Furthermore, users have gradually expanded from middle-aged technical professionals to include elderly persons and children, both of whom are unlikely to have much computer expertise. In client-server applications it is highly desirable that data transactions be graphical in nature and intuitive to use.

Therefore, there remains a need for improvement in information retrieval.

SUMMARY OF THE INVENTION

A computer-implemented information retrieval method is provided according to one embodiment of the invention. The method comprises the step of generating a filtering query by specifying at least one query operator from selected data groupings of a filter tree table. The method further comprises the step of running the filtering query against an unfiltered data table containing items of data. The method further comprises the step of creating a filtered data table by receiving one or more data items filtered from the unfiltered data table in response to the filtering query and placing the received data items in the filtered data table. The method further comprises the step of displaying data items in the filtered data table. The method further comprises the step of displaying filter data in the filter tree table. The filter data includes selected data groupings. The method further comprises the step of accepting a user input that selects or de-selects a data grouping to be filtered and displayed. The method further comprises the step of branching back to the generating step upon receipt of the user input.

A computer-implemented information retrieval method is provided according to another embodiment of the invention. The method comprises the steps of selecting one or more data sets and creating an unfiltered data table by receiving in the unfiltered data table a plurality of data items from the one or more data sets. The method further comprises the step of displaying the plurality of data items of the unfiltered data table. The method further comprises the step of generating a filter tree table. The filter tree table includes selectable data groupings for the one or more data sets. The method further comprises the step of generating a filtering query from selected data groupings of the filter tree table. The filtering query comprises one or more query operators. The method further comprises the step of running the filtering query against the unfiltered data table. The method further comprises the step of creating a filtered data table by receiving in the filtered data table one or more data items filtered from the unfiltered data table in response to the filtering query. The method further comprises the step of displaying data items in the filtered data table. The method further comprises the step of generating a summary query from selected data groupings of the filter tree table. The method further comprises the step of running the summary query against the filtered data table. The method further comprises the step of generating a summary result comprising a data item count for each selected data grouping. The method further comprises the step of updating the filter tree table with the summary results. The method further comprises the step of displaying filter data in the filter tree table. The filter data includes selected data groupings and associated data item counts. The method further comprises the step of accepting a user input that selects or de-selects a data grouping to be filtered and displayed. The method further comprises the step of branching back to the updating a filter tree table step upon receipt of a user input.

An information retrieval process is provided according to one embodiment of the invention. The information retrieval process comprises the step of providing a data set to an unfiltered data table. The process further comprises the step of generating a filtering query by selecting one or more query operators. The one or more query operators correspond to selected data groupings in a filter tree table. The process further comprises the step of running the filtering query against the unfiltered data table. The process further comprises the step of receiving one or more data items in a filtered data table. The one or more data items are filtered from the unfiltered data table in response to the filtering query. The process further comprises the step of displaying the one or more data items in the filtered data table. The process further comprises the step of generating a summary query from selected data groupings in the filter tree table. The process further comprises the step of running the summary query against the filtered data table to produce a summary result. The summary result comprises a data item count for each selected data grouping. The process further comprises the step of providing the summary result to the filter tree table. The process further comprises the step of displaying the filter tree table. The process further comprises the step of accepting a user input to the filter tree table. The user input comprises a selection or de-selection of a data grouping. The process further comprises the step of branching back to the step of generating a filtering query upon receipt of a user input.

An information retrieval apparatus is provided according to one embodiment of the invention. The information retrieval apparatus comprises a processor and a user interface communicating with the processor. The user interface is also capable of interfacing with a user. The apparatus further comprises an unfiltered data table communicating with the processor and capable of storing one or more data items. The apparatus further comprises a filtered data table communicating with the processor and capable of storing one or more filtered data items. The apparatus further comprises a filter tree table communicating with the processor and capable of storing one or more selected data groupings.

The processor receives user inputs from the user interface and controls a flow of data items into the unfiltered data table. The processor generates at least one filtering query using selected data groupings in the filter tree table and runs the at least one filtering query against the unfiltered data table. The processor fills the filtered data table with filtered data items from the unfiltered data table and displays the filtered data table. The processor displays the filter tree table and accepts user inputs to the filter tree table. The processor generates a filtering query upon receipt of a user input.

The above and other features and advantages of the present invention will be further understood from the following description of the preferred embodiments thereof, taken in conjunction with the accompanying drawings.

BRIEF DESCRIPTION OF THE DRAWINGS

FIG. 4 is a screen shot of a database display generated according to the invention;

FIG. 6 is a screen shot reflecting changes in selections from the screen shot of FIG. 4.

DETAILED DESCRIPTION OF THE PREFERRED EMBODIMENTS

Figure 1:
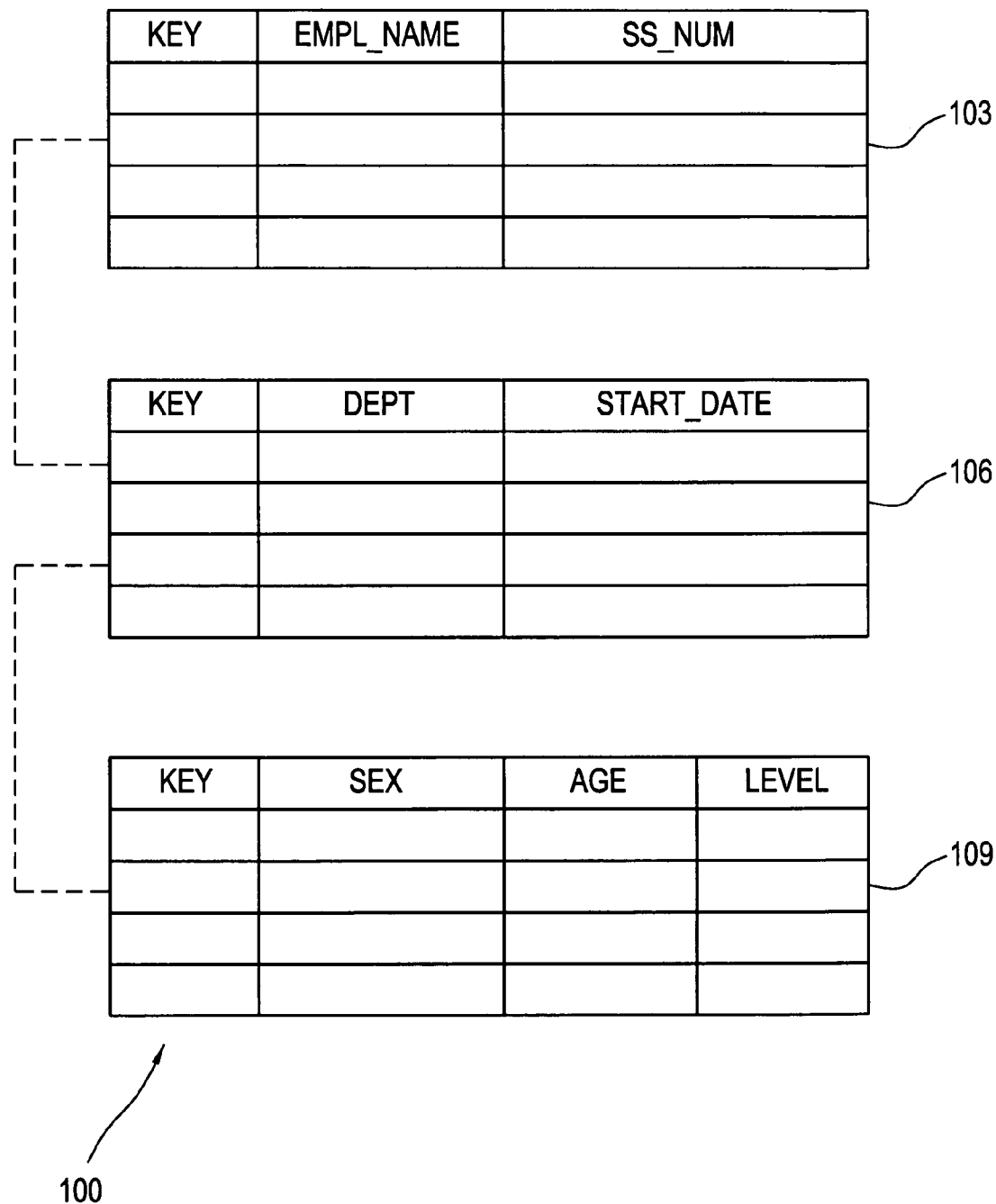
FIG. 1 shows a typical database comprising multiple data tables.
Figure 2:
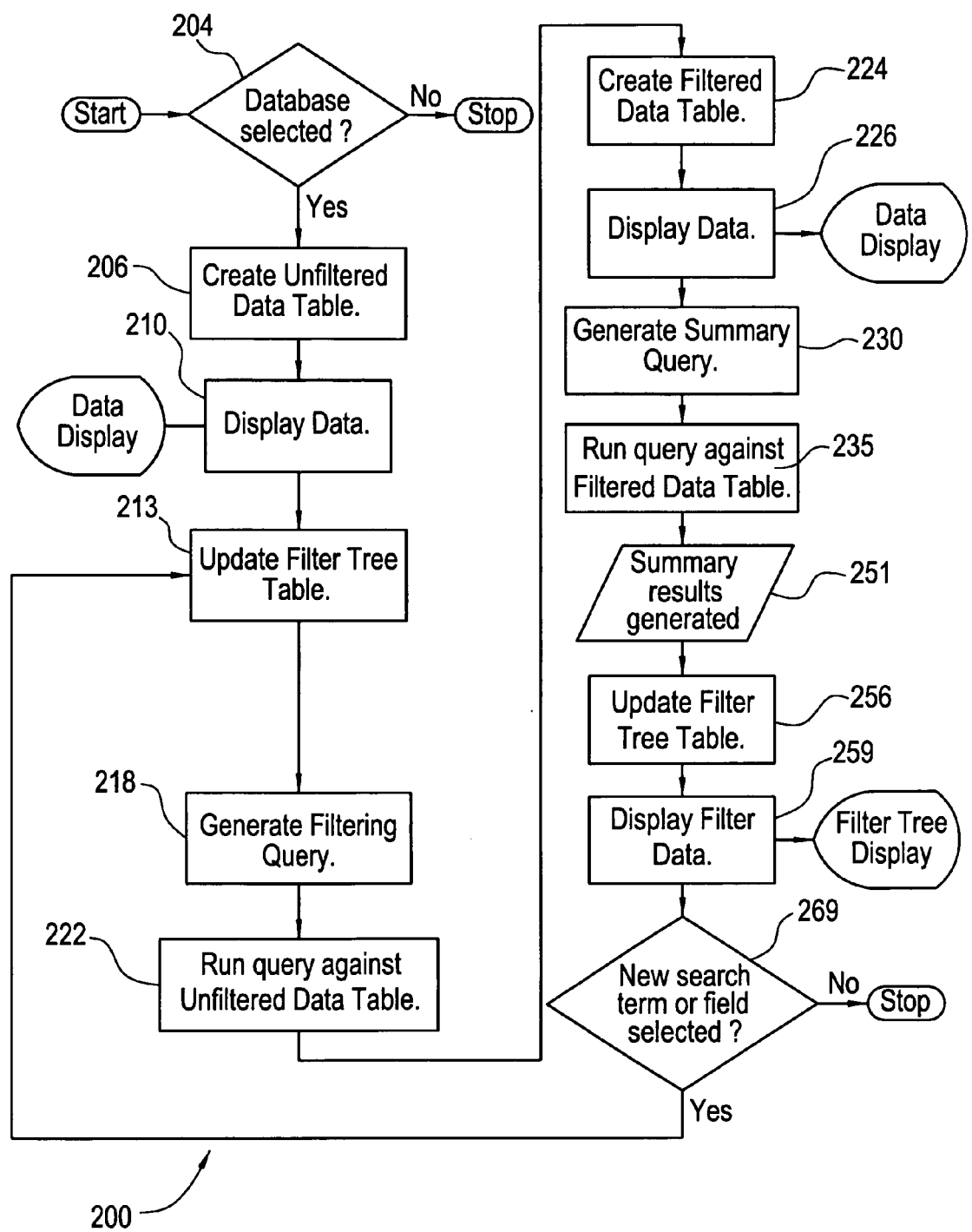
FIG. 2 is a flowchart of one information retrieval method embodiment according to the invention.

FIG. 2 is a flowchart 200 of one information retrieval method embodiment according to the invention. The flowchart 200 reflects a computer implementation wherein a user may filter and retrieve digital data according to the invention.

In step 204, a data source is selected. The data source may include one or more databases, data tables, etc. The data source selection may be made automatically or may be performed by a user.

In step 206, an unfiltered data table receives data from the selected data source or sources. The data source may be a database, a table, etc., and may include multiple data sources. The unfiltered data table may therefore serve as a data accumulator and as a data translator, as the unfiltered data table may be capable of translating data items into a desired data format. In addition, the data source may be an external data source, and the unfiltered data table may communicate with the data source over some manner of communication link, such as over a computer network, a telephone line, a wireless communication link, etc.

In step 210, the data in the unfiltered data table is optionally displayed. All data in the data set will be displayed, as no filtering of the data has yet been performed.

In step 213, a filter tree table is updated. The filter tree table contains one or more filters that may be used to filter the unfiltered data table. The one or more filters form a parametric filter that may be used to interactively and iteratively define the data display. Although the parametric filter and therefore the filter tree table do not necessarily have to be in a tree configuration, for purposes of discussion the table will be referred to as a filter tree table.

The filter tree table reflects possible user selection choices in the parametric filter. It is used to generate filtering queries that are sent to the unfiltered data table. These filtering queries are employed to filter the data contained in the unfiltered data table.

In any pass of the loop except the startup pass, the filter tree table may be updated by configuring the filter tree table according to the user selections (reflected in the parametric filter). In a startup pass, the filter tree table may be configured according to a default. The default may select all filters (all data items are displayed), may select no filters (no data items are displayed), or may select some combination of filters.

In step 218, a filtering query is generated. The filtering query may be automatically generated, and reflects all data grouping selections in the parametric filter. The filtering query may be any type of filtering query that selects and organizes data for display and/or manipulation, such as a SQL database query. The filtering query is typically composed of query operators, including Boolean operators, that may be used to select data items from the data set available to the user in the unfiltered data table.

In step 222, the filtering query is run against the unfiltered data table. The filtering query therefore controls the flow of data from the unfiltered data table to a filtered data table.

In step 224, the filtered data table is filled with data items filtered from the unfiltered data table. The filtered data table therefore contains the filtered data items received from the unfiltered data table as a result of the filtering query.

In step 226, the data items in the filtered data table are displayed to the user. This may include generating the display data to an attached output device, such as a computer screen or monitor. Alternatively, it may include transmission of the data to the user when the user is at a remote site. An example of this is in a client server arrangement where the client, i.e., the user, is communicating with the server, i.e., a computer running a software according to the invention. The resulting data items or records may be displayed in a table, graph, or other format according to the user's needs.

In step 230, a summary query is generated. The summary query is used to obtain data item counts and data item results for each data grouping selected in the parametric filter (as reflected in the filter tree table). Therefore, each iteration of the method comprises two queries, a filtering query and a summary query.

In step 235, the summary query is run against the filtered data table in order to generate a summary result.

In step 251, the summary result is generated from the data items in the filtered data table.

In step 256, the filter tree table is updated with the summary result. This may include a data item count for each data grouping displayed in the parametric filter. The data item count is the number of displayed data items for that particular data grouping (see FIG. 4 and accompanying discussion).

In addition, any manner of arithmetic or data operation may be performed on a data field and displayed. The result of such an operation is termed a data item results. The data item results may reflect any manner of numerical totals of data within a data grouping. For example, if a data grouping is a column in a table such as a costs field, the data item results number may be a summary of all selected costs in the column. If every row having a cost column entry is selected, the data item result would therefore contain a total cost. Alternatively, if not all of the rows that have an entry in the cost data field column are selected, the data item result total may reflect only a partial total of all available entries. The data item results may therefore operate like a spreadsheet, and may automatically provide a tally for a particular data grouping.

In step 259, the filter data is displayed to the user (discussed below in conjunction with FIG. 4). The filter data may be graphically displayed to the user as a parametric filter. The parametric filter may be a tree, may be a hierarchal tree having one or more tree levels, or may be a table, graph, or other custom graphical configuration. The parametric filter controls the display of the various columns of a database or data set in order to present the various data groupings and associated data items in some sort of visual organization. The parametric filter therefore visually indicates to the user the selected data groupings in the filter tree table. In addition, the parametric filter may show available data groupings that are not selected, if the parametric filter is hierarchical. The parametric filter therefore enables the interactive, iterative filtering according to the invention.

In step 269, the method accepts user input. If the user generates an input, such as selecting or de-selecting a particular data grouping, the method branches back to step 213. In this manner, the method allows the user to interactively and iteratively define and refine the data display by selecting and de-selecting items from the parametric filter.

If no input is received, the method may loop until an input is received. Therefore, the user is not limited to a single selection, and the method may continue to accept inputs, modify the query, and modify the set of displayed data items. The invention advantageously includes multiple filters working in conjunction. Therefore, when the user makes a single selection or de-selection, all applicable filters are changed. As a result, data grouping changes may ripple through the filters.

It should be noted that the branching provides a feedback of the filtering result. By employing this feedback mechanism, the user can iteratively refine a query until a desired result is achieved. This is in contrast to the prior art, where if a query does not produce a desired display, the user must reformulate the query, and is not able to refine and modify an existing filtering query.

The user input may comprise a selection or de-selection of a data grouping in a parametric filter level. The user input may be accepted as an input to a selection icon 508, such as a checkbox, for example (see FIG. 5). The selection icon 508 may show selected and non-selected states, reflecting the user's command to show or not show the data items associated with the particular selection icon.

The user input may be received from a remote location, such as in a client-server architecture. Alternatively, the user input may be input directly to a database management system from an input device linked to the database management system. Furthermore, the input may be obtained from multiple data sources, such as multiple databases, for example.

In a preferred embodiment, the method according to the invention may be implemented in a client-server arrangement, wherein the database and the database management system exists on a data server that can be accessed by a client. The client may access the server in any manner, such as through a network, through a phone link, through a wireless network link, etc. Alternatively, the database and database management system and user may all exist on a single computer or computer device.

One benefit of the graphical information retrieval according to the invention is that the user can graphically and intuitively navigate data in a database and select data. The user can de-select information that is not of interest or that is not pertinent. Therefore, the user can perform actions more quickly and efficiently.

In addition, another benefit of the graphical information retrieval according to the invention is that a user may quickly generate reports (or other output) containing only desired or necessary items, and may quickly filter the data in the database. This may be very helpful where a database is complex and/or contains many data types. For example, a user may focus on a particular data grouping, such as a priority data field (i.e., a table column, see FIG. 4) and may display and/or output only the rows that have a certain priority level. In addition, the user may select and display multiple data fields and data types, and do so in an easy manner.

In yet another benefit, the graphical information retrieval according to the invention may allow a user to more quickly assess and understand the amount and types of data in a data set. This may be accomplished by reviewing the data displayed in response to a selection of data groupings. It may also be accomplished by selecting and de-selecting data groupings and viewing the data items brought into the data display area 402 as a result of each data grouping selection.

Furthermore, the user may quickly and easily move between displays. Therefore, if a user wants to look at a column or data field having a certain data value and additionally wants to see other rows and columns that correspond to that column or data field, the user may quickly and easily move between those two displays by selecting and de-selecting the appropriate data groupings. In this manner, a user may contrast and compare data of two or more displays.

The benefits of the invention are especially advantageous due to the increased use of databases and the increased use of client-server databases accessible over a network. For example, many large databases are available over the Internet, wherein a user who has no previous experience with a particular database may access the database. By employing the information retrieval according to the invention, the user does not need to learn the database type, the database program, or especially the types and amounts of data within the data set.

Figure 3:
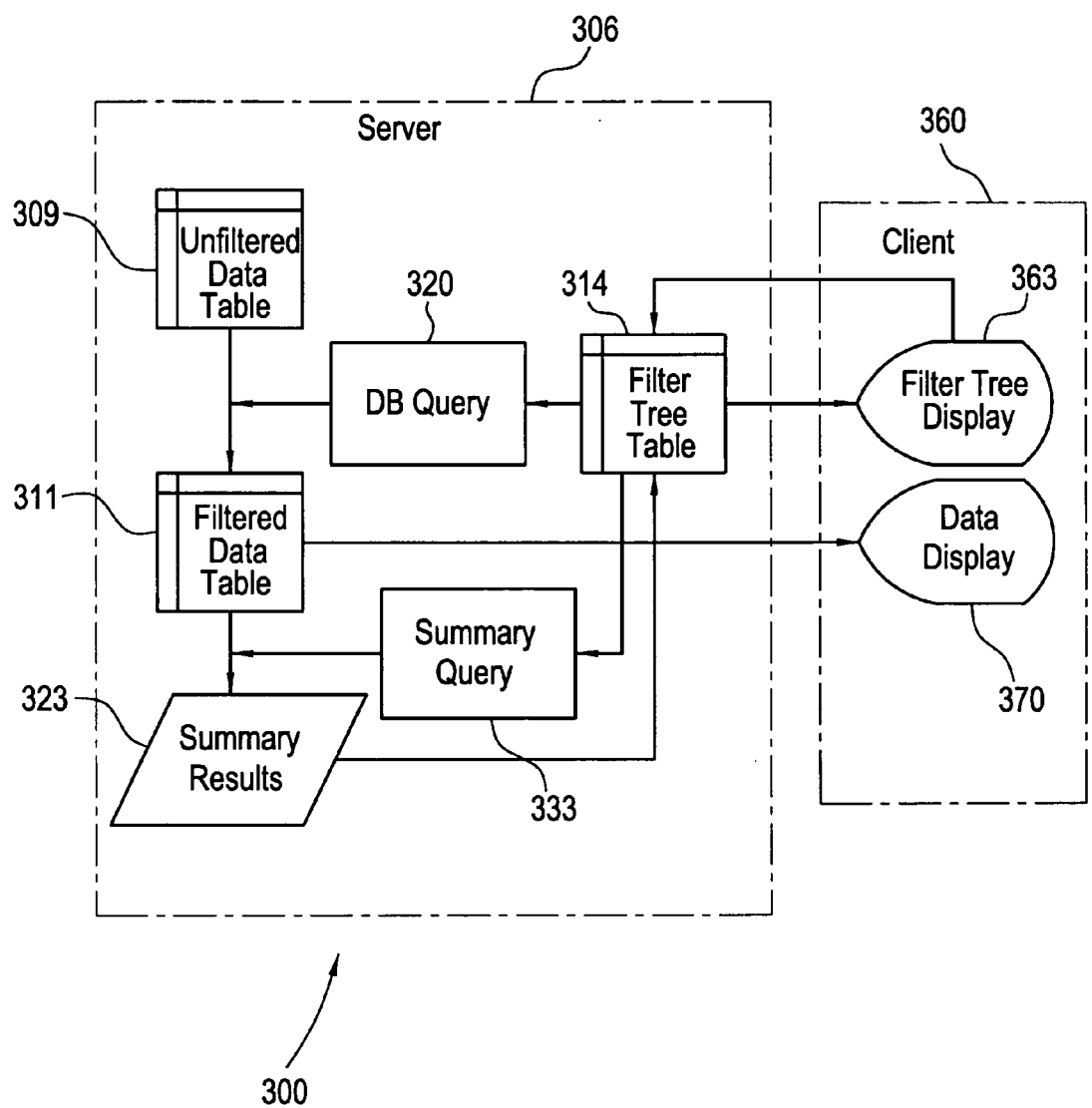
FIG. 3 shows a process flow diagram illustrating data flow in a server and a client.

FIG. 3 shows a process flow diagram 300 illustrating data flow in a server 306 and a client 360. The unfiltered data table 309 in the start of the process receives data from a data source. The data source may be any source of data, such as one or more databases, data tables, etc.

The filter tree table 314 receives inputs from the client (i.e., the arrow from the filter tree display 363). In response, the filter tree table 314 generates two queries for each user selection or de-selection, a filtering query and a summary query.

The filtering (database) query 320 causes a transfer of data items from the unfiltered data table 309 to the filtered data table 311. The filtering query 320 is created from the selected data groupings in the filter tree table 314. The filtered data table 311 therefore reflects all data items selected through the filtering query 320.

The filtered data in the filtered data table 311 is communicated to the data display 370 of the client 360. As a result, the data display 370 displays all selected data items.

In the second query, the data in the filter tree table 314 is used to generate a summary query 333. The summary query 333 requests data item counts for the selected data groupings, and optionally requests data item results. The data item counts and the data item results are generated from the data items in the filtered data table 311 to form the summary result 323.

The summary result 323 is communicated to the filter tree table 314. When the summary result 323 is received in the filter tree table 314, then the contents of the filter tree table 314 are communicated to the filter tree display 363.

Therefore, by using both the filtering query 320 and the summary query 333, the client 360 receives a data display and a filter tree display according to a current parametric filter.

FIG. 4 is a screen shot 400 of a database display generated according to the invention. The screen shot 400 includes a parametric filter display 405 and a data display area 402. The data display area 402 shows at least a portion of a selected database or data set. The data display area 402 may have multiple rows and columns for displaying at least some of the rows and columns of the selected database or data set. The data may be organized as records, for example. It should be understood that the data display area 402 is not limited to displaying a database or table, but may also display data items in other forms, such as data graphs, charts, etc.

The parametric filter display 405 contains a parametric filter that enables an organization of data within the data set (such as a hierarchical organization, for example). The parametric filter display 405 controls the data groupings and data items shown in the data display area 402. Any changes to the parametric filter display 405, such as a new selection or de-selection of a data grouping, will cause a change in the data shown in the data display area 402.

A data grouping may be any grouping of data capable of being selected by a user. This may include data groupings such as a table column (i.e., "Status," for example), records, or may include any data grouping based on the data within a data set. For example, a data grouping may be "Date Due," which is a first filter level 411 and is also a table column. Other data groupings could be a year or a month of a particular year, for example.

The parametric filter display 405 may be broken down into a first filter level 411, a second filter level 414, a third filter level 418, etc. Located beneath each first filter level entry are data groupings or data items associated with that first filter level entry. Each filter level may have multiple filter levels beneath it, according to how a particular data set is defined. Lower filter level entries may also have an associated data item count that reflects the number of data items associated with the lower filter level data grouping.

In the example parametric filter shown, the parametric filter display 405 has as first filter levels "Organization," "Date Due," and "Resp. Person." In a second filter level 414 under "Organization" is "Acme Company." In a third filter level 418 under "Acme Company" is "Chemical Division" and "Examples." More filter levels may be included as needed.

In the figure, the October data grouping for the year 2000 contains ten data items. Therefore, if the user is to scroll through the data display area 402, the user will see 10 items under the "Date Due" column that have a due date of October, 2000. This may be further determined by looking under the first filter level 411 for date due, under the second filter level 414 for 2000 as year, and a third filter level 418 for October. In the example shown, the October data grouping shown includes only October entries for the year 2000. It should be noted that the levels could be arranged in other ways, such as a month filter level could have one or more years as lower filter levels, for example.

The display may further include a data item count 444 for each displayed data grouping. A data item count 444 reflects the number of data items included in the particular data grouping. For example, the "Safety Engineer" data grouping includes six data items for the safety engineer.

In a preferred embodiment, only selected data groupings have an associated data item count 444. Alternatively, all displayed data groupings, including selected and de-selected data groupings, may include a data item count.

It should be understood that if the data item count for a particular data grouping is zero, the data grouping does not necessarily disappear. All possible instances that are capable of being selected are displayed (except where there are no items already associated with the data grouping). For example, if the year 2000 is selected, all months that have data associated with the year 2000 are displayed. In a preferred embodiment, the data filtering may be configured so that the data grouping remains displayed until the user de-selects it. In a less preferred embodiment, the data filtering may be configured so that a data grouping disappears from the display if an associated data item count is zero.

The advantage presented by a data item count 444 is that the user can quickly grasp the number of items that are included in a selected data grouping, even though not all of the relevant data items may be physically shown in the data display area 402 without scrolling. For example, by being able to visually understand the numbers of data items, the user may be able to tell whether he or she has selected the proper entries from the parametric filter display 405. Conversely, the user may also be able to determine if an insufficient number of data groupings are currently selected.

A change to a data selection in one part of the parametric filter display 405 may affect other parts of the parametric filter display 405. Because the data items are interrelated, a selection or de-selection of a data item may therefore affect the data item counts of other data groupings. For example, de-selecting the data grouping "Facilities Manager" may generally change the data item counts for various year and/or month data groupings.

By presenting the organization of the data set in a graphical user interface (GUI) comprising a parametric filter, users can easily and quickly comprehend the organization of the data set. Furthermore, the user can easily and quickly specify what data groupings are displayed. The result is a user interface that allows quick and easy information retrieval without having to learn any special commands. Therefore, the user interface is easily manipulated without the need for any training.

Figure 5:
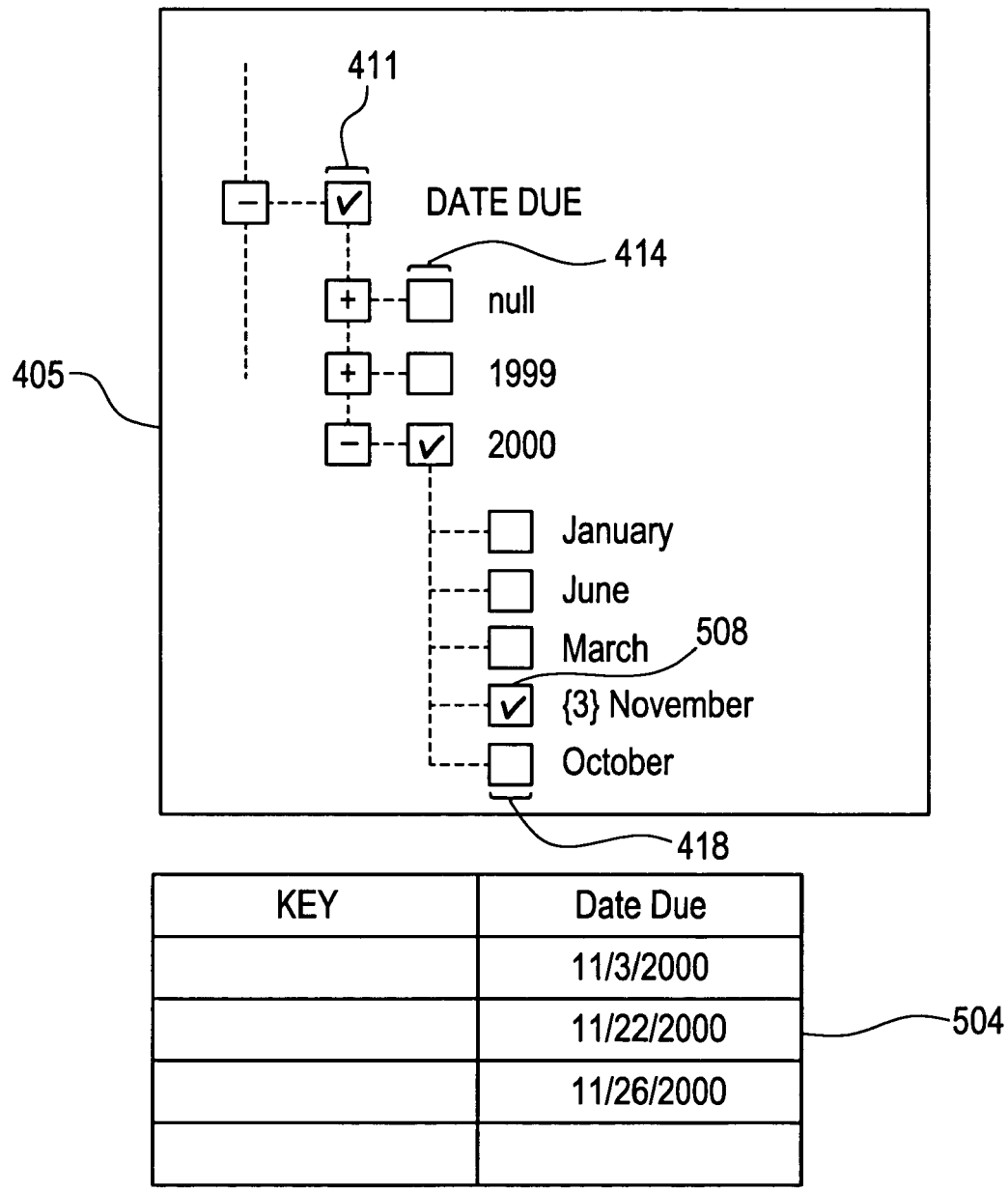
FIG. 5 illustrates how a parametric filter is translated into a filtering query.

FIG. 5 illustrates how the parametric filter is translated into a filtering query. As previously discussed, a user may select or de-select a particular data grouping in the parametric filter, as is shown in the portion of the parametric filter display 405. In this example, the "November" selection icon 508 has just been selected by the user (the "Date Due" and "2000" selection icons were previously selected). The selection query may search for and display data set entries in a date due field 504 that contain both the month of November AND the year 2000. Therefore, a user may easily add or remove data grouping selections from a database query merely by selecting or de-selecting appropriate selection icons.

This figure illustrates that the lower filter levels 414, 418, etc., determine the amount of filtering. If no lower filter levels are selected for a filter, all filters are included and no data items are displayed for the particular filter (i.e., all data items are filtered out). Conversely, if all lower filter levels are selected, no filters are included and all data is displayed. Each selection by a user therefore serves to define part of a query, and each selection corresponds to one or more query operators included in a query sent to the database management system (including, for example, Boolean operators).

A database management system (or other software) may set up the parametric filter so that each data field or column of a table or database has a corresponding first level filter entry.

FIG. 6 is a screen shot 600 reflecting changes in selections from the screen shot 400 of FIG. 4. The user has not changed the "Organization", "Date Due," and "Resp. Person" data grouping selections in the first filter level 411, but the user has de-selected all but the "Environmental Coordinator" and the "Safety Engineer" as responsible persons in the second filter level 414. Note that the data item counts for those data groupings are unchanged. However, in contrast the total data item counts for the "Acme Company" has dropped from 61 to 13. Furthermore, in response to de-selection of several responsible persons, the "Date Due" data grouping has been updated to reflect the current number of instances associated with each month. In this example, the number of October instances was reduced from 10 to only 1. The total number of instances of any date is now 13 (the year 1999 and November, 2000, contain no data items), matching the "Resp. Person" data grouping. Note that the "Organization" data grouping has also been updated to reflect 13 total data items. Note that in the two screen shots, the data displayed in the data display area 402 is the data which matches the total combination of all the selected data groupings.

Figure 7:
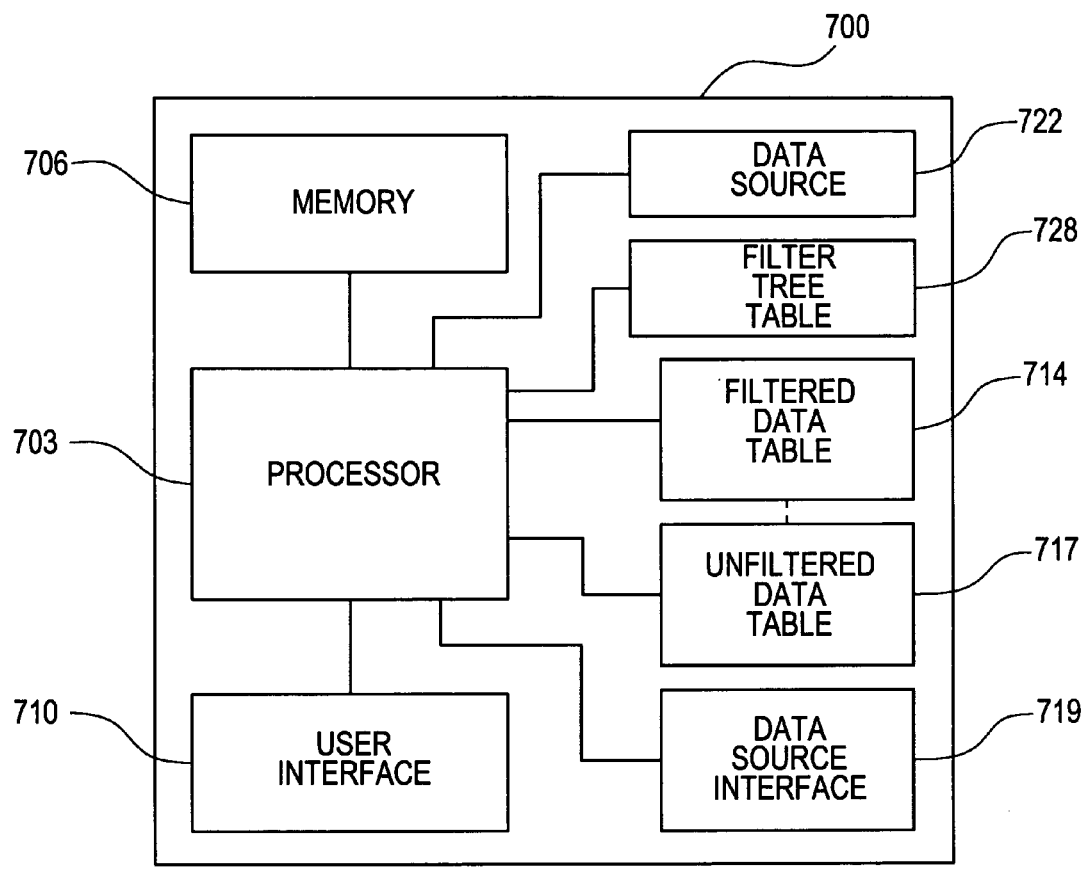
FIG. 7 is an information retrieval system according to one embodiment of the invention.

FIG. 7 is an information retrieval system 700 according to one embodiment of the invention. The information retrieval system 700 includes a processor 703, a memory 706, a user interface 710, a data source interface 719, an unfiltered data table 717, a filtered data table 714, a filter tree table 728, and optionally a data source 722.

The processor 703 may be any type of processor. The processor 703 may execute software routines stored in the memory 706, and may execute an information retrieval according to the invention.

The memory 706 may be any type of digital memory, including a random access memory (RAM), a read-only memory (ROM), a magnetic storage medium such as tape or disk, optical memory, etc.

The user interface 710 accepts user inputs and generates output to the user. The user input may include a data set selection. The user input may further include selections and de-selections of data groupings displayed in a parametric filter. The outputs may include displaying portions of a data set and displaying a parametric filter.

It should be understood that the user may be remote from the information retrieval system 700, and will typically communicate with the server over some sort of communication link or network, such as for example, a local area network (LAN), a wide area network (WAN), a virtual private network (VPN), over the Internet, via a modem, via a wireless modem, over a public switched telephone network (PSTN), etc. Therefore, the user interface 710 may include a communications interface, such as a modem, network card, etc., that enables data communication between the information retrieval system 700 and the user. In addition, the user interface 710 may allow multiple users to interface with the information retrieval system 700. It should be noted that the method according to the invention could equally well be implemented on a single computer device, such as, for example, a personal computer or a mainframe computer having multiple work stations wherein the client and client displays are part of the computer system.

The data source interface 719 enables the information retrieval system 700 to communicate with one or more external data sources. The external data sources may be databases, data tables, etc. The data source interface 719 may be used by the information retrieval system 700 to accumulate data items from multiple data sources. In addition, the data source interface 719 may translate data items into a desired data format. Furthermore, the data source interface 719 may perform some pre-processing on the data items. For example, the data source interface 719 may add identification data to incoming data items.

The unfiltered data table 717 receives and holds data items received from external data sources. The unfiltered data table 717 therefore contains the raw, unfiltered data. The unfiltered data table 717 is preferably a relational database and may contain multiple rows and multiple columns.

The filtered data table 714 receives data items received from the unfiltered data table 717 in response to a filtering query. Accordingly, data in the filtered data table 714 is a subset of the data set contained within the unfiltered data table 717. Preferably, the filtered data table 714 is similar to the unfiltered data table 717 in size, data format, etc. The data items in the filtered data table 714 may be displayed to the user.

The filter tree table 728 includes all data groupings (i.e., filters) of the parametric filter. A data grouping selection or de-selection by a user is reflected in the filter tree table 728.

The filter tree table 728 also includes data item counts and data item results, as produced by a summary query. The data groupings, the data item counts, and the data item results are displayed to the user.

Each filter within the filter tree table 728 may include several information items. One information item is the relationship of one filter to the other filters in the filter tree table 728. For example, the year filter may be the child of the Date Due filter, and the month filter may be a child of the year filter. Therefore, each filter may contain an information item entry that indicates the filters above and below the particular filter (or otherwise related to the filter). These relationships may be used to determine any needed recalculations when a filter is selected or de-selected.

Another information item may be a filter type, such as a date filter, a year filter, or a standard filter, for example.

Yet another information item may be whether a particular filter is currently selected or de-selected. This information item may control display calculations, among other things, and is used when a query is generated (only the selected filters are included in a query).

Yet another information item may be a filter display name, such as "Facilities Manager." This is desirable because a filter may be internally labeled in a cryptic manner, such as "fac_mgr", for example. The filter display name may be used to display an appropriately descriptive name for each filter.

Yet another information item may be a quantity of data items that match a particular filter (i.e., a data item count). In addition, the quantity may be a data item result. The data item result may be, for example, a summation of a data field such as cost, and may be stored instead of or in addition to a data item count.

When a filter is added to the parametric filter, it is added to the filter tree table 728. When a query is generated that causes a new data grouping to be displayed, the data grouping/new filter is added to the filter tree table 728. Whenever a data item count changes, based on a new query, the data item count is changed in the filter tree table 728. Furthermore, whenever a filtering query or summary query is generated, it is generated from entries within the filter tree table 728.

The optional data source 722 may be a data source (or sources) internal to the information retrieval system 700. The data source 722 may be included in addition to external data sources.

The information retrieval system 700 according to the invention may be implemented through a software program. The software program may be available on a disk, through a network download, etc. The information retrieval system 700 may be a complete software package, including a database or tables, a database management system, and the parametric filtering according to the invention. Alternatively, the information retrieval system 700 may be added to an existing database or data storage as an additional functionality.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computer-implemented information retrieval method, comprising the steps of:
    accepting a user input for selecting at least one data source;
    receiving a plurality of data items from said data source;
    creating an unfiltered data table that includes said plurality of data items;
    displaying said unfiltered data table;
    generating a filter tree table that includes selectable data groupings associated with said plurality of data items;
    accepting a user input for selecting or de-selecting at least one data grouping;
    generating a filtering query, based on the selected data groupings, that includes at least one query operator;
    running said filtering query against said unfiltered data table;
    receiving a plurality of filtered data items from said unfiltered data table in response to said filtering query;
    creating a filtered data table that includes said plurality of filtered data items;
    displaying said filtered data table;
    generating a summary query based on the selected data groupings;
    running said summary query against said filtered data table;
    generating a summary result including a data item count for each selected data grouping;
    updating said filter tree table with said summary results;
    displaying said filter tree table including said selected data groupings and associated data item counts; and
    branching back to said accepting a user input for selecting or de-selecting a data grouping.

2. The method of claim 1, wherein said data source comprises a database.

3. The method of claim 1, wherein said data source comprises one or more data tables.

4. The method of claim 1, wherein a first filter level of said filter tree table corresponds to a column in said data source.

5. The method of claim 1, wherein data item counts are automatically updated upon a data grouping selection or de-selection by said user.

6. The method of claim 1, wherein all data groupings are automatically recalculated upon a selection or de-selection by said user.

7. The method of claim 1, wherein said generating a filtering query step includes creating said filtering query based on selected data groupings.

8. The method of claim 1, wherein said filtering query is a SQL query.

9. The method of claim 1, wherein said user input includes clicking on a selection icon corresponding to a predetermined data grouping.

10. The method of claim 1, wherein said summary result further includes a data item result for said each selected data grouping.

11. An information retrieval process, comprising the steps of:
    generating a filtering query based upon one or more user-selected data groupings in a filter tree table, said data groupings being associated with a plurality of data items in an unfiltered data table;
    running said filtering query against said unfiltered data table;
    receiving one or more filtered data items from said unfiltered data table in response to said filtering query;
    creating a filtered data table including said one or more filtered data items;

displaying said one or more filtered data items in said filtered data table;

generating a summary query from the user-selected data groupings in said filter tree table;

running said summary query against said filtered data table to produce a summary result including a data item count for each user-selected data grouping;

providing said summary result to said filter tree table;

displaying said filter tree table; and branching back to said step of generating a filtering query.

12. The information retrieval process of claim 11, further comprising the steps of:

selecting one or more data sets automatically or in response to a user input;

receiving said plurality of data items from said one or more data sets;

creating said unfiltered data table based on said plurality of data items from said one or more data sets;

displaying said unfiltered data table; and updating said filter tree table with selectable data groupings associated with said plurality of data items.

13. The information retrieval process of claim 11, further including a preliminary step of selecting a data set.

14. The information retrieval process of claim 13, wherein said data set comprises a database.

15. The information retrieval process of claim 13, wherein said data set comprises one or more data tables.

16. The information retrieval process of claim 13, wherein a first filter level of said filter tree table corresponds to a column in said data set.

17. The information retrieval process of claim 11, wherein data item counts are automatically updated upon a data grouping selection or de-selection by said user.

18. The information retrieval process of claim 11, wherein all data groupings are automatically recalculated upon a selection or de-selection by said user.

19. The information retrieval process of claim 11, wherein said filtering query is a SQL query.

20. The information retrieval process of claim 11, wherein said user-selected data groupings are input by clicking on a selection icon corresponding to a predetermined data grouping.

21. The information retrieval process of claim 11, wherein said summary result further includes a data item result for said each selected data grouping.

\* \* \* \* \*